US010374740B2

(12) United States Patent
Matsuyama

(10) Patent No.: US 10,374,740 B2
(45) Date of Patent: Aug. 6, 2019

(54) ADD/DROP MULTIPLEXER, NETWORK SYSTEM, TRANSMISSION METHOD, NON-TRANSITORY COMPUTER READABLE MEDIUM, AND MANAGEMENT DEVICE

(71) Applicant: NEC Corporation, Tokyo (JP)

(72) Inventor: Yurie Matsuyama, Tokyo (JP)

(73) Assignee: NEC Corporation, Tokyo (JP)

(*) Notice: Subject to any disclaimer, the term of this patent is extended or adjusted under 35 U.S.C. 154(b) by 63 days.

(21) Appl. No.: 15/545,588

(22) PCT Filed: Jan. 25, 2016

(86) PCT No.: PCT/JP2016/000346
§ 371 (c)(1),
(2) Date: Jul. 21, 2017

(87) PCT Pub. No.: WO2016/121361
PCT Pub. Date: Aug. 4, 2016

(65) Prior Publication Data
US 2018/0006755 A1 Jan. 4, 2018

(30) Foreign Application Priority Data
Jan. 27, 2015 (JP) .................................. 2015-013258

(51) Int. Cl.
*H04J 14/02* (2006.01)
*H04B 10/27* (2013.01)
(Continued)

(52) U.S. Cl.
CPC ............ *H04J 14/021* (2013.01); *H04B 10/27* (2013.01); *H04B 10/572* (2013.01); *H04J 14/00* (2013.01); *H04J 14/02* (2013.01); *H04Q 3/52* (2013.01)

(58) Field of Classification Search
CPC ....... H04B 10/27; H04B 10/572; H04J 14/00; H04J 14/021; H04J 14/02; H04Q 3/52
See application file for complete search history.

(56) References Cited

U.S. PATENT DOCUMENTS 7,218,858 B1 5/2007 Lundquist et al.
7,706,690 B2 4/2010 Nagata et al.
(Continued)

FOREIGN PATENT DOCUMENTS

CN 1466304 1/2004
CN 101222277 7/2008
(Continued)

OTHER PUBLICATIONS

Decision on Grant dated Jul. 31, 2018, in counterpart Russian Patent Application No. 2017129807/07.
(Continued)

*Primary Examiner* — Mina M Shalaby
(74) *Attorney, Agent, or Firm* — Finnegan, Henderson, Farabow, Garrett & Dunner, L.L.P.

(57) ABSTRACT

Provided is a wavelength path communication node device with no collision of wave lengths and routes, capable of outputting arbitrary wavelengths, and capable of outputting them to arbitrary routes. An add/drop multiplexer (11) includes a communication unit (101) that communicates an optical signal with at least one client device and at least one network and a control unit (102) that indicates a transfer destination of the optical signal according to an attribute of the received optical signal to the communication unit (101). The control unit (102) indicates an attenuation amount of the optical signal to the communication unit (101) for each connected device. When a connected device is changed, the control unit (102) instructs the communication unit (101) to change the attenuation amount. The communication unit (101) attenuates the optical signal with the attenuation (Continued)

amount indicated by the control unit (102) and transfers the attenuated optical signal to a transfer destination.

8 Claims, 10 Drawing Sheets

(51) Int. Cl.
*H04B 10/572* (2013.01)
*H04J 14/00* (2006.01)
*H04Q 3/52* (2006.01)

(56) References Cited

U.S. PATENT DOCUMENTS

| | | | |
|---|---|---|---|
| 8,917,988 B2 | 12/2014 | Zhou | |
| 2004/0179845 A1* | 9/2004 | Yamashita | H04J 14/0201 398/83 |
| 2006/0018658 A1 | 1/2006 | Mori | |
| 2007/0025729 A1* | 2/2007 | Barnard | H04J 14/0204 398/5 |
| 2007/0147841 A1* | 6/2007 | Takita | H04J 14/0204 398/83 |
| 2011/0182585 A1 | 7/2011 | Shoji et al. | |
| 2011/0188851 A1* | 8/2011 | Oda | H04J 14/021 398/26 |
| 2012/0148236 A1 | 6/2012 | Kumar et al. | |
| 2012/0218617 A1 | 8/2012 | Hayashitani | |
| 2012/0224170 A1 | 9/2012 | Hisamoto | |
| 2016/0156429 A1* | 6/2016 | Boduch | H04J 14/021 398/34 |

FOREIGN PATENT DOCUMENTS

| | | |
|---|---|---|
| CN | 102790653 | 11/2012 |
| EP | 2 355 388 | 8/2011 |
| JP | 2001-230730 | 8/2001 |
| JP | 2001-274751 | 10/2001 |
| JP | 2007-148042 | 6/2007 |
| JP | 2007-208691 | 8/2007 |
| JP | 2010-103781 | 5/2010 |
| JP | 2010-219729 | 9/2010 |
| JP | 2011-40997 | 2/2011 |
| JP | 2011-155612 | 8/2011 |
| JP | 2011-160162 | 8/2011 |
| JP | 2011-254309 | 12/2011 |
| JP | 2012-5088 | 1/2012 |
| JP | 2013-5016 | 1/2013 |
| JP | 2013-123205 | 6/2013 |
| JP | 2013-531909 | 8/2013 |
| JP | 2013-201517 | 10/2013 |
| JP | 2014-22865 | 2/2014 |
| RU | 2505940 C2 | 2/2011 |
| WO | WO 2009/145118 | 12/2009 |
| WO | WO 2011/055724 | 5/2011 |

OTHER PUBLICATIONS

Office Action dated May 3, 2018, by the Chinese Patent Office in counterpart Chinese Patent Application No. 201680007594.6.
Extended European Search Report dated Aug. 1, 2018, in counterpart European Patent Application No. 16742965.3.
Decision to Grant a Patent dated Dec. 25, 2018, by the Japanese Patent Office in counterpart Japanese Patent Application 2018-003954.
International Search Report and Written Opinion dated Mar. 22, 2016, in corresponding PCT International Application.
Office Action dated Jan. 26, 2016, by the Japanese Patent Office in counterpart Japanese Patent Application No. 2015-013258.
Office Action dated Aug. 16, 2016, by the Japanese Patent Office in counterpart Japanese Patent Application No. 2015-013258.

* cited by examiner

ADD/DROP MULTIPLEXER, NETWORK SYSTEM, TRANSMISSION METHOD, NON-TRANSITORY COMPUTER READABLE MEDIUM, AND MANAGEMENT DEVICE

CROSS-REFERENCE TO RELATED PATENT APPLICATIONS

This application is a National Stage Entry of International Application No. PCT/JP2016/000346, filed Jan. 25, 2016, which claims priority from Japanese Patent Application No. 2015-013258, filed Jan. 27, 2015. The entire contents of the above-referenced applications are expressly incorporated herein by reference.

TECHNICAL FIELD

The present invention relates to an add/drop multiplexer, a network system, a transmission method, a control program, and a management device, and, for example, to an add/drop multiplexer, a network system, a transmission method, a control program, and a management device used in an optical communication network using a wavelength division multiplexing and demultiplexing technique.

BACKGROUND ART

Recently, with the expansion of services dealing with large capacity contents such as audio and video, there is an increasing need for an optical transmission network supporting large capacity and long distance. In order to satisfy such a need, introduction of WDM (Wavelength Division Multiplexing) technology in a recent optical transmission network is being considered.

In the optical communication using the WDM technique, it is possible to form signal channels for respective wavelengths within one optical fiber cable in view of the fact that an optical signal at a certain wavelength passing through the optical fiber does not interfere with an optical signal of a different wavelength.

It is therefore possible to greatly increase the amount of information that can be transmitted per unit time by a single optical fiber cable. In addition, in order to construct a more flexible network, development and introduction of ROADM (Reconfigurable Optical Add/Drop Multiplexer) and the like as a terminal device, a relay device, and an add/drop multiplexer for adding and dropping optical signals in units of optical wavelength are being developed.

Network technology using this ROADM is disclosed in Patent Literature 1 to 4. In ROADM disclosed in the below-listed documents, optical signals transmitted from a connection destination are attenuated, a difference in power between the optical signals is adjusted, and the adjusted optical signals are multiplexed.

CITATION PATENT LITERATURE

Patent Literature 1: Japanese Unexamined Patent Application Publication No. 2011-040997
Patent Literature 2: Japanese Unexamined Patent Application Publication No. 2013-123205
Patent Literature 3: Published Japanese Translation of PCT International Publication for Patent Application, No. 2013-531909
Patent Literature 4: International Patent Publication No. WO2009/145118

SUMMARY OF INVENTION

Technical Problem

However, in the conventional add/drop multiplexer, as the attenuation amount of the optical signals is fixed, there is a problem that a device to be connected to the add/drop multiplexer cannot be changed.

An object of the present invention is to provide an add/drop multiplexer capable of arbitrarily changing a device to be connected to the add/drop multiplexer.

Solution to Problem

According to the present invention, an add/drop multiplexer includes: a communication unit capable of selectively transferring a received wavelength multiplex optical signal to at least one client device and at least one network for each wavelength constituting the wavelength multiplex optical signal; and a control unit for indicating a transfer destination of an optical signal at a predetermined wavelength according to an attribute of the optical signal at the predetermined wavelength to the communication unit, the predetermined wavelength being included in the wavelength multiplex optical signal. The control unit indicates an attenuation amount of the optical signal at the predetermined wavelength according to the transfer destination of the optical signal at the predetermined wavelength to the communication unit, and the communication unit attenuates the optical signal at the predetermined wavelength according to the indication of the control unit, and then transfers the attenuated optical signal to the transfer destination.

According to the present invention, a network system includes: an add/drop multiplexer configured to be capable of selectively transferring a received wavelength multiplex optical signal to at least one client device and at least one network for each wavelength constituting the wavelength multiplex optical signal; and a control device configured to indicate a transfer destination of an optical signal at a predetermined wavelength according to an attribute of the optical signal at the predetermined wavelength to the add/drop multiplexer, the predetermined wavelength being included in the wavelength multiplex optical signal. The add/drop multiplexer attenuates the optical signal at the predetermined wavelength with the attenuation amount according to the transfer destination of the optical signal at the predetermined wavelength and transfers the attenuated optical signal to the transfer destination.

According to the present invention, a transmission method includes: selectively transferring a received wavelength multiplex optical signal to at least one client device and at least one network for each wavelength constituting the wavelength multiplex optical signal; and determining a transfer destination of an optical signal at a predetermined wavelength according to an attribute of the optical signal at the predetermined wavelength, the predetermined wavelength being included in the wavelength multiplex optical signal; specifying the attenuation amount according to the transfer destination of the optical signal at the predetermined wavelength; and attenuating the optical signal at the predetermined wavelength according to the specified attenuation amount and transferring the attenuated optical signal to the transfer destination.

According to the present invention, a control program for an add/drop multiplexer configured to be capable of selectively transferring a received wavelength multiplex optical signal to at least one client device and at least one network for each wavelength constituting the wavelength multiplex optical signal, the control program comprising steps of: receiving change information on a connected device; and changing an attenuation amount when the connected device is changed.

According to the present invention, a control device includes: an interface configured to be capable of selectively transferring a received wavelength multiplex optical signal to at least one client device and at least one network for each wavelength constituting the wavelength multiplex optical signal; and control unit capable of controlling the add/drop multiplexer via the interface. The control unit indicates a transfer destination of an optical signal at a predetermined wavelength according to an attribute of the optical signal at the predetermined wavelength and indicates an attenuation amount of the optical signal at the predetermined wavelength according to the transfer destination of the optical signal at the predetermined wavelength to the add/drop multiplexer.

Advantageous Effects of Invention

According to the present invention, it is possible to provide an add/drop multiplexer capable of arbitrarily changing a device to be connected to the add/drop multiplexer.

DESCRIPTION OF EMBODIMENTS

First Embodiment

Figure 1:
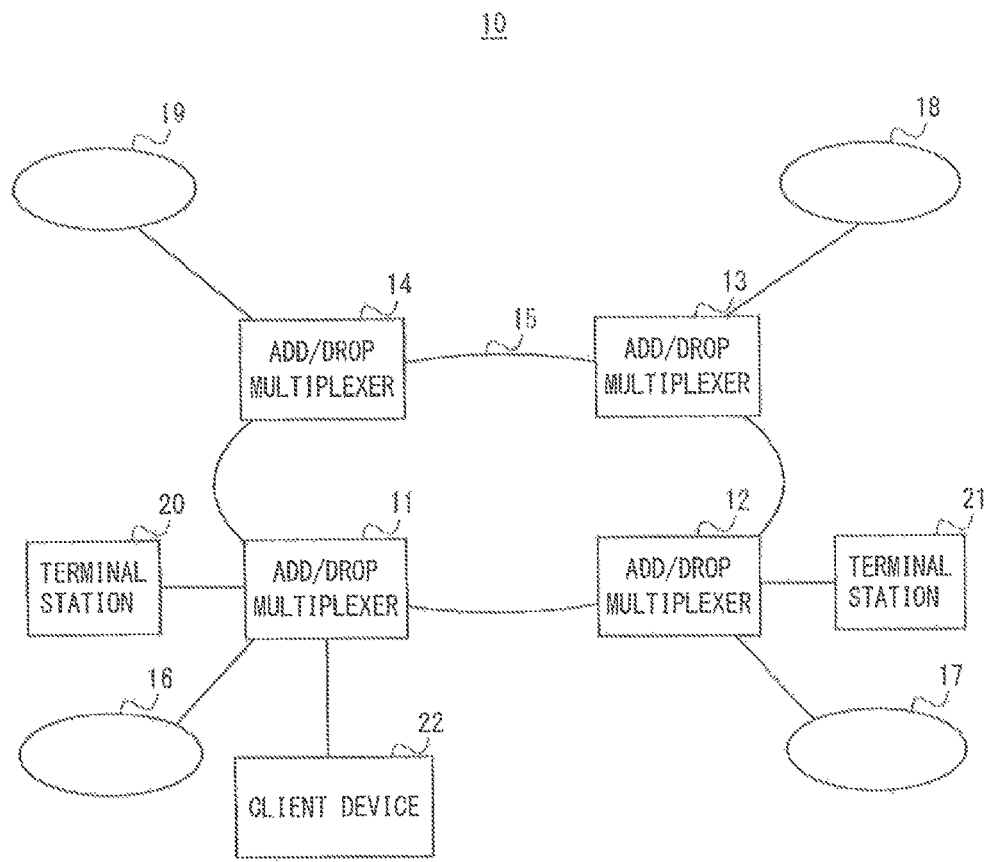
FIG. 1 is a block diagram showing a configuration of a network system according to a first embodiment of the present invention.

Hereinafter, an add/drop multiplexer and a network system according to a first embodiment of the present invention will be described with reference to the drawings. FIG. 1 is a block diagram showing a configuration of the network system according to the first embodiment of the present invention. In FIG. 1, a network system 10 includes add/drop multiplexers 11 to 14, networks 15 to 19, terminal stations 20 and 21, and a client device 22.

The add/drop multiplexers 11 to 14 are connected to each other via the network 15. The add/drop multiplexers 11 to 14 are also connected to the networks 16 to 19, respectively, and to the terminals 20 and 21 and the client device 22. For these connections, it is preferable to use, for example, cables for transmitting the optical signals such as optical fibers and the like.

The add/drop multiplexers 11 to 14 transfer the optical signals received from the respective devices according to communication paths.

The add/drop multiplexer 11 is connected to the network 15, the network 16, the terminal station 20 and the client device 22. The add/drop multiplexer 11 receives optical signals from the network 15, the network 16, the terminal station 20, and the client device 22. Then, the add/drop multiplexer 11 selects the communication path according to the attribute of the received optical signal and transfers the optical signal to the device, i.e., transfer destination, of the selected communication path.

The transfer destination device is one of the devices connected to the add/drop multiplexer. For example, for the add/drop multiplexer 11, the transfer destination device is one of the network 15, the network 16, the terminal station 20, and the client device 22.

The add/drop multiplexer 11 adjusts the power of the optical signal to be transferred when transferring the optical signal, and then transfers the optical signal to the transfer destination device. That is, the add/drop multiplexer 11 attenuates the power of the optical signal to be transferred and transfers the attenuated optical signal to the transfer destination device.

When the device connected to the add/drop multiplexer 11 (e.g., the network 16, the terminal station 20, or the client device 22) is changed, the add/drop multiplexer 11 changes the attenuation amount. Then, the add/drop multiplexer 11 attenuates the power of the optical signal to be transferred with the changed attenuation amount, and transfers the attenuated optical signal to the transfer destination device. The attenuation amount of the optical signal is specified and changed for each device connected to the add/drop multiplexer 11.

Figure 2:
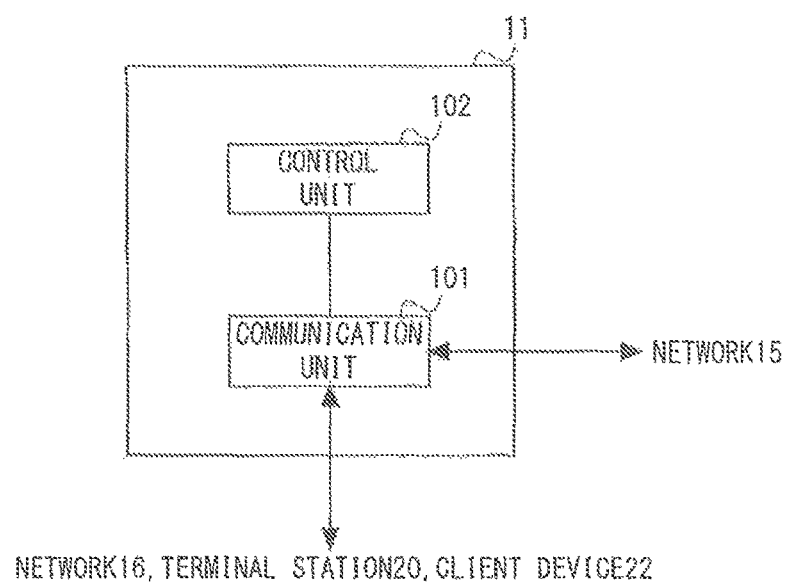
FIG. 2 is a block diagram showing a configuration of an add/drop multiplexer according to the first embodiment of the present invention.

Next, a configuration of the add/drop multiplexer will be described. FIG. 2 is a block diagram showing a configuration of the add/drop multiplexer according to the first embodiment of the present invention. In FIG. 2, the add/drop multiplexer 11 includes a communication unit 101 and a control unit 102. The add/drop multiplexer 11 in FIG. 2 corresponds to the add/drop multiplexers 11 to 14 in FIG. 1.

The communication unit 101 is connected to the network 15. The communication unit 101 is also connected to the client device 22, the terminal station 20, or the network 16. Then, the communication unit 101 transfers the optical signal received from the network, the client device, the terminal station, or the network to the transfer destination device indicated by the control unit 102.

Next, the communication unit 101 receives the optical signal from the network 15, the client device 22, the terminal station 20, or the network 16, and attenuates the received optical signal with the attenuation amount indicated by the control unit 102. Then, the communication unit 101 transfers the attenuated optical signal to the transfer destination device.

The control unit 102 selects the communication path according to the attribute of the received optical signal and instructs the communication unit 101 to transfer the optical signal to the selected communication path. The control unit 102 indicates the attenuation amount specified for each device connected to the communication unit 101 to the communication unit 101.

When the device connected to the communication unit 101 is changed, the control unit 102 indicates the attenuation amount corresponding to the changed device to the communication unit 101.

Figure 3:
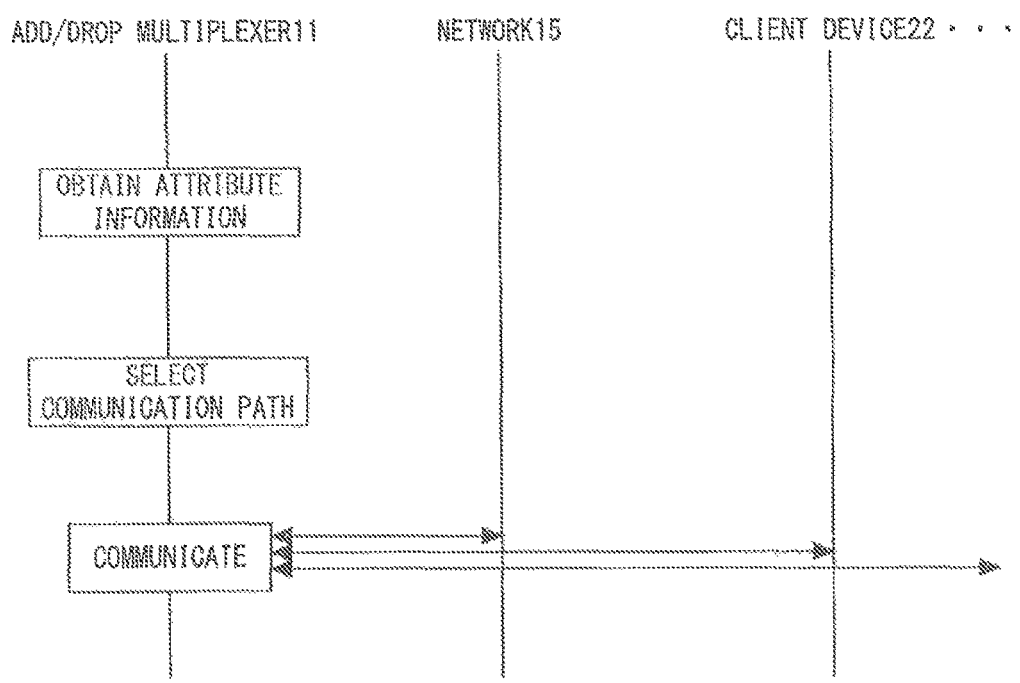
FIG. 3 is a sequence diagram showing an example of communication in the network system according to the first embodiment of the present invention.

Next, a communication procedure between the add/drop multiplexer and the network and the client device will be described. FIG. 3 is a sequence diagram showing an example of communication in the network system according to the first embodiment of the present invention.

In FIG. 3, the add/drop multiplexer 11 obtains attribute information of the optical signal to be communicated. For example, the add/drop multiplexer 11 obtains the attribute information of the optical signal to be communicated based on the received optical signal or an external control signal. Next, the add/drop multiplexer 11 selects the communication path according to the attribute of the received optical signal. Then, the add/drop multiplexer 11 communicates the optical signal through the selected communication path.

For example, when the received optical signal is an optical signal to be transmitted to the client device 22 connected to the add/drop multiplexer 11, the add/drop multiplexer 11 transmits the optical signal to the client device 22. When the received optical signal is an optical signal to be transmitted to another device via the network 15 connected to the add/drop multiplexer 11, the add/drop multiplexer 11 transmits the optical signal to the network 15. Note that the client device 22 may be the network 16 or the terminal station 20 in FIG. 1.

The optical signal transmitted from the add/drop multiplexer 11 is an optical signal with its power adjusted by being attenuated by the add/drop multiplexer 11. The attenuation amount of the optical signal is changed when the device connected to the add/drop multiplexer 11 is changed because of addition/deletion of the network or addition/deletion of the client device. Consequently, even if the device connected to the add/drop multiplexer 11 is changed, it is possible to communicate optical signals with appropriate power.

As described above, according to the add/drop multiplexer of the first embodiment, when the device connected to the add/drop multiplexer is changed, the device connected to the add/drop multiplexer cars be arbitrarily changed by changing the attenuation amount of the optical signal communicated by the add/drop multiplexer.

Second Embodiment

Figure 4:
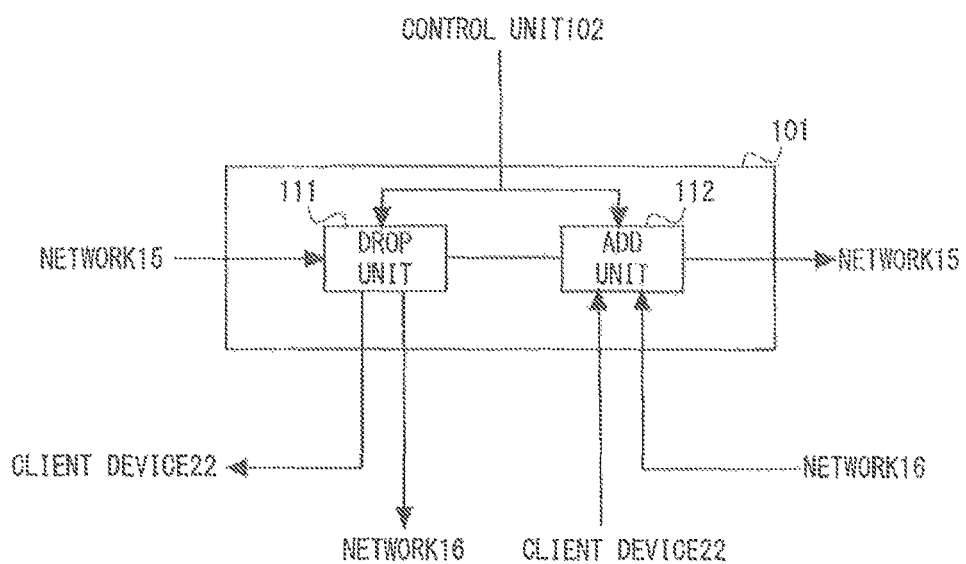
FIG. 4 is a block diagram showing a configuration of a communication unit of an add/drop multiplexer according to a second embodiment of the present invention.

FIG. 4 is a block diagram showing a configuration of a communication unit of an add/drop multiplexer according to a second embodiment of the present invention. The same components as those in FIG. 1 are denoted by the same reference signs, and descriptions thereof are thus omitted. In FIG. 4, the communication unit 101 includes a drop unit 111 and an add unit 112. The configuration of the communication unit 101 in FIG. 4 corresponds to that of the communication unit 101 in FIG. 2.

The drop unit 111 drops the optical signal received from the network and determines a transmission destination of the optical signal according to an instruction from the control unit 102. If the transmission destination of the optical signal is a drop destination device (e.g., the client device 22 or the network 16) connected to the drop unit 111, the drop unit 111 transmits the optical signal to the drop destination device. Further, the drop unit 111 outputs optical signals other than the dropped optical signal to the add unit 112.

For example, when the received optical signal is a multiplexed optical signal, the drop unit 111 drops, from the multiplexed optical signal, the optical signal addressed to the client device 22 or the network 16 connected to the drop unit 111, attenuates the dropped optical signal with the attenuation amount specified for the corresponding connected device, and transmits the attenuated optical signal to the client device 22 or the network 16 connected to the drop unit 111.

When the drop destination device connected to the drop unit 111 is changed, the drop unit 111 changes the attenuation amount. Next, the drop unit 111 attenuates the power of the dropped optical signal with the changed attenuation amount. Then, the drop unit 111 transmits the attenuated optical signal to the drop destination device.

The add unit 112 receives the optical signal from the client device 22 or the network 16 connected to the add unit 112 and attenuates the received optical signal with the attenuation amount specified for each connected device. Next, the add unit 112 adds the attenuated optical signal to the optical signal output from the drop unit 111, and transmits the added optical signal to the network 15.

When an add source device connected to the add unit 112 is changed, the add unit 112 changes the attenuation amount. Next, the add unit 112 attenuates the power of the optical signal to be transferred with the changed attenuation amount, and adds the attenuated optical signal to the optical signal of the network 15. The attenuation amount of the optical signal is specified and changed for each device connected to the add unit 112.

The following is a comparison between the add/drop multiplexer of the second embodiment and a conventional add/drop multiplexer. In the conventional device, the attenuation amount of the optical signal is fixed. Thus, the level of the optical signal input to the add unit 112 is changed when the device connected to the add unit 112 is changed, thereby changing the level of the optical signal input to the add unit 112 and causing the balance between the power of the adding optical signal and that of the added optical signal to be lost. Therefore, when the power of one of the adding optical signal and the added optical signal is too strong, interference is given to the other one of the optical signals to be deteriorated.

On the other hand, in the add/drop multiplexer of the second embodiment, even when the device connected to the add unit 112 is changed, the attenuation amount is changed according to the power of the optical signal from the changed device. By doing so, the balance between the power of the adding optical signal and that of the added optical signal will not be lost. Therefore, even if an arbitrary connection to an arbitrary port is established, it is possible to prevent one of the adding optical signal and the added optical signal from interfering and deteriorating the other.

As described above, according to the add/drop multiplexer of the second embodiment, when the device to be connected is changed, the attenuation amount of the optical signal transmitted from the connected device is changed. By doing so, the balance between the power of the adding optical signal and that of the added optical signal can be maintained, thereby reducing an influence of the interference caused by the addition of the optical signal.

Note that in the above description, both the drop unit 111 and the add unit 112 are included. However, only the drop unit 111 may be included, or only the add unit 112 may be included.

Third Embodiment

Figure 5:
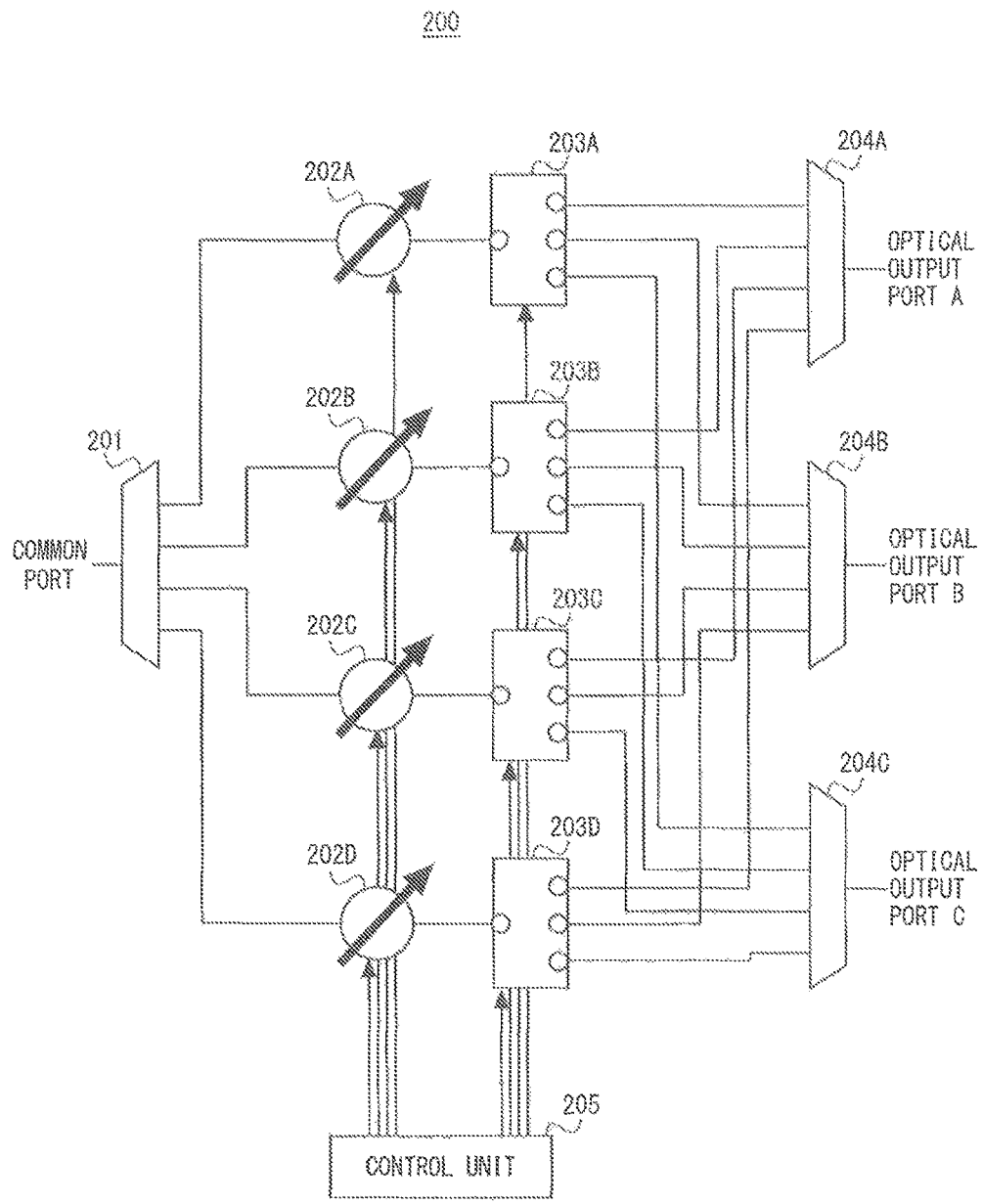
FIG. 5 is a drawing showing a configuration of a wavelength selective switch according to a third embodiment of the present invention.

In a third embodiment, an example in which the add/drop multiplexer is applied to a Wavelength Selective Switch will be described. FIG. 5 is a drawing showing a configuration of the wavelength selective switch according to the third embodiment of the present invention. A wavelength selective switch 200 in FIG. 5 has a configuration that can be applied to the drop unit 111 in FIG. 4. In FIG. 5, the wavelength selective switch 200 is composed of a wavelength demultiplexer 201, variable optical attenuators 202A to 202D, optical switches 203A to 203D, multiplexers 204A to 204C, and a control unit 205.

The wavelength demultiplexer 201 demultiplexes the optical signal input from a common port into optical signals at different wavelengths. Then, the wavelength demultiplexer 201 outputs the demultiplexed optical signals to the variable optical attenuators 202A to 202D for the respective wavelengths.

The variable optical attenuators 202A to 202D attenuate the optical signals. Then, the variable optical attenuators 202A to 202D output the attenuated optical signals to the optical switches 203A to 203D, respectively. The attenuation amounts in the variable optical attenuators 202A to 202D are variable and are determined according to an instruction from the control unit 205.

The optical switches 203A to 203D each select an output destination of the optical signal from the multiplexers 204A to 204C and output the optical signal to the selected multiplexer.

The multiplexers 204A to 204C multiplex the optical signals output from the optical switches 203A to 203D. Then, the multiplexers 204A to 204C output the multiplexed optical signals to optical output ports A to C, respectively.

Figure 9:
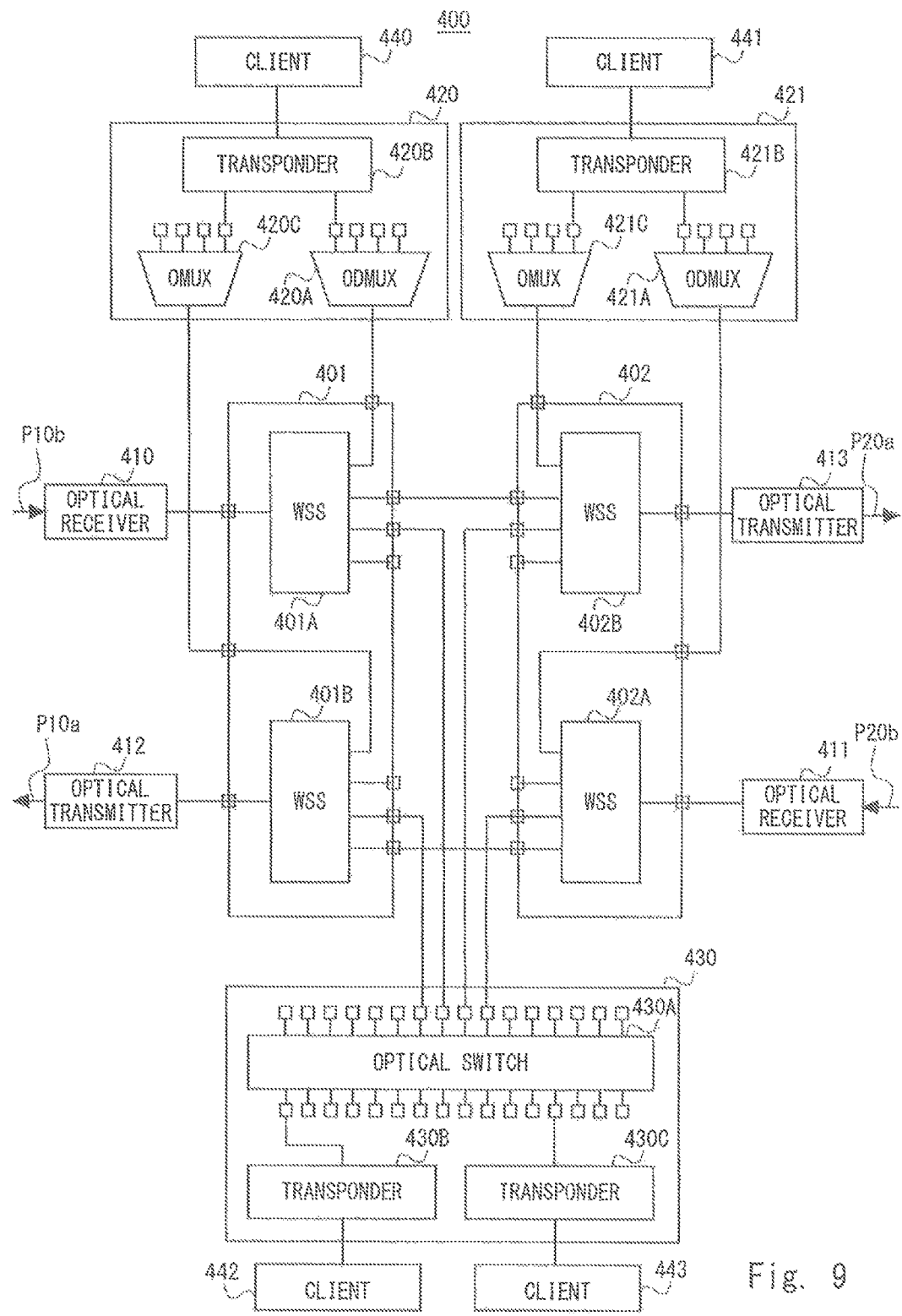
FIG. 9 is a block diagram showing a configuration example of a wavelength path communication node device according to the third embodiment of the present invention.

The control unit 205 indicates the attenuation amounts for the variable optical attenuators 202A to 202D and also indicates selection destinations of the optical switches 203A to 203D. The selection destinations of the optical switches 203A to 203D are determined by route information provided from the outside. As shown in FIG. 9, which will be described later, when there are a plurality of routes, the control unit 205 may be provided for each route, and the control unit 102 may control the plurality of control units 205.

Further, the attenuation amounts of the variable optical attenuators 202A to 202D are specified for the respective wavelengths which are demultiplexed by the wavelength demultiplexer 201 based on connection destination information of the optical output ports A to C that output the wavelengths. The connection destination information is information relating to devices and networks connected to the optical output ports A to C. When the device to which the optical output port is connected is changed, the control unit 205 changes the attenuation amount of the output port whose connection destination device is changed.

Figure 6:
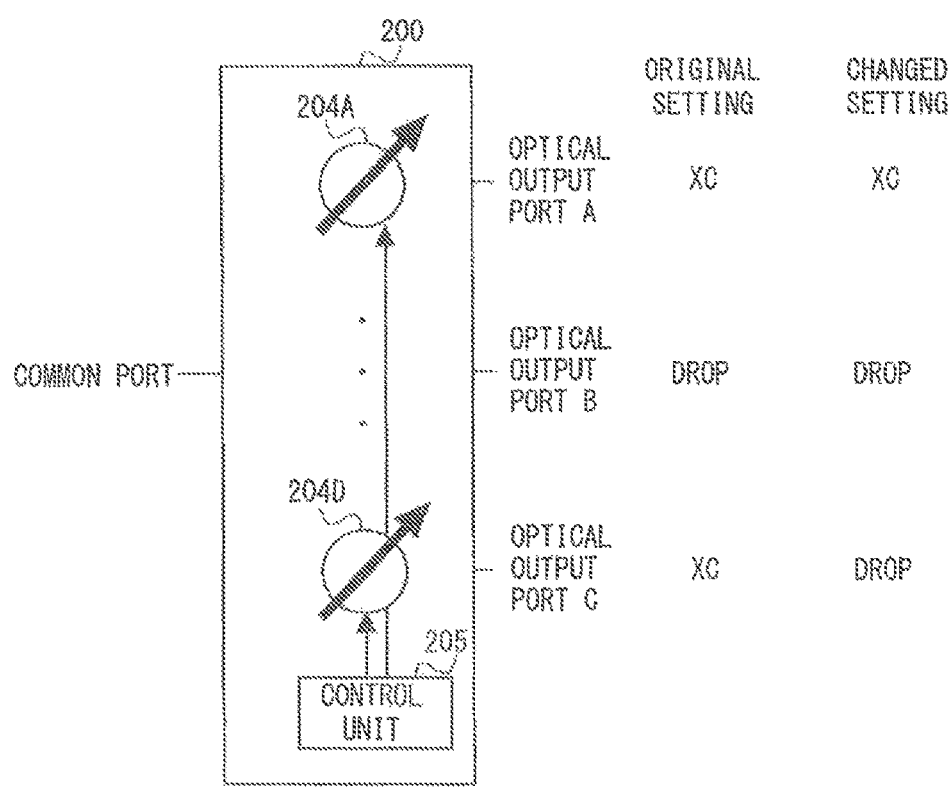
FIG. 6 is a drawing showing an example in which a device to which an output port is connected is changed in a wavelength selective switch according to the third embodiment of the present invention.

FIG. 6 is a drawing showing an example in which the device to which the output port is connected is changed in the wavelength selective switch according to the third embodiment of the present invention. In FIG. 6, XC indicates that the connection destination is a cross-connect (wavelength cross-connect), and DROP indicates a dropping client device. In FIG. 6, the wavelength selective switch 200 is connected to the cross-connects at the optical output ports A and C and to the dropping client device at the optical output port B.

When the connected device of the optical output port C is changed from the cross-connect to the dropping client device, the control unit 205 instructs the variable optical attenuators 202A to 202D corresponding to the optical output port C to change the attenuation amount.

By changing the attenuation amount in this way, the power of the signal from the optical output port C becomes a level suitable for the dropping client device.

Figure 7:
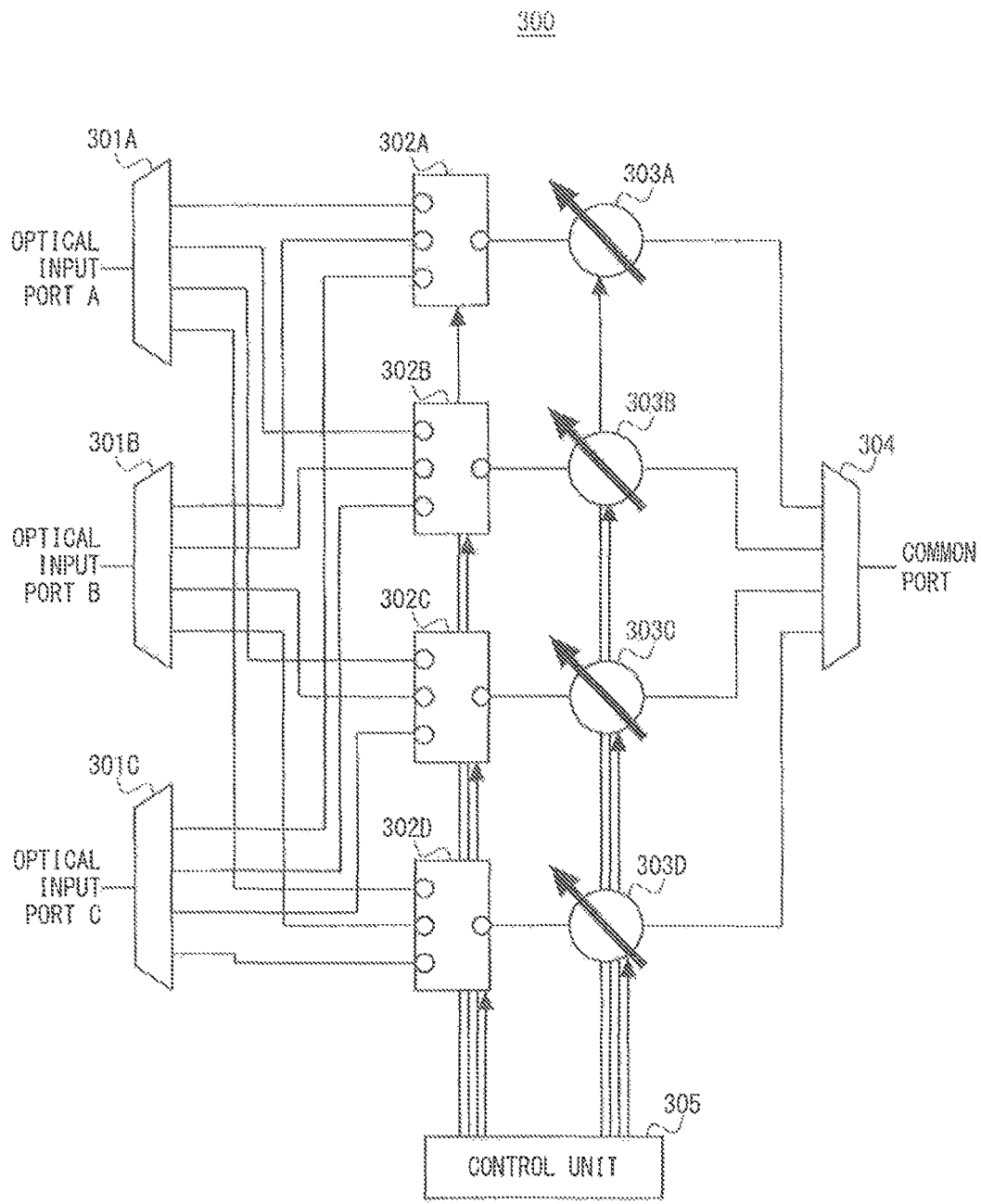
FIG. 7 is a drawing showing a configuration of the wavelength selective switch according to the third embodiment of the present invention.

Next, an example in which the wavelength selective switch is applied to the add unit 112 will be described. FIG. 7 is a drawing showing a configuration of a wavelength selective switch according to the third embodiment of the present invention. A wavelength selective switch 300 in FIG. 7 has a configuration that can be applied to the add unit 112 in FIG. 4. In FIG. 7, the wavelength selective switch 300 is composed of wavelength demultiplexers 301A to 301C, optical switches 302A to 302D, variable optical attenuators 303A to 303D, a multiplexer 304, and a control unit 305.

The wavelength demultiplexers 301A to 301C demultiplex the optical signals input from the optical input ports A to C into optical signals at different wavelengths. Then, the wavelength demultiplexers 301A to 301C output the demultiplexed optical signals to the optical switches 302A to 302D for the respective wavelengths.

The optical switches 302A to 302D select the optical signals output from the wavelength demultiplexers 301A to 301C and output them to the variable optical attenuators 303A to 303D, respectively.

The variable optical attenuators 303A to 303D attenuate the optical signals input from the optical input ports. Then, the variable optical attenuators 303A to 303D output the attenuated optical signals to the multiplexer 304. The attenuation amounts in the variable optical attenuators 303A to 303D are variable and are determined according to an instruction from the control unit 305.

The multiplexer 304 multiplexes the optical signals output from the variable optical attenuators 303A to 303D. Then, the multiplexer 304 outputs the multiplexed optical signal to the common port.

The control unit 305 indicates the attenuation amounts of the variable optical attenuators 303A to 303D and also indicates the selection sources of the optical switches 302A to 302D. The selection sources of the optical switches 302A to 302 are determined by route information provided from the outside. As shown in FIG. 9, which will be described later, when there are a plurality of routes, the control unit 305 may be provided for each route, and the control unit 102 may control the plurality of control units 305.

Further, the attenuation amounts of the variable optical attenuators 303A to 303D are specified for the respective wavelengths which are demultiplexed by the wavelength demultiplexer 301A to 301C based on connection destination information of the input ports A to C that input the wavelengths. The connection destination information is information relating to devices and networks connected to the input ports A to C. When the device to which the input port is connected is changed, the control unit 305 changes the attenuation amount of the input port to which the connection destination device is changed.

Figure 8:
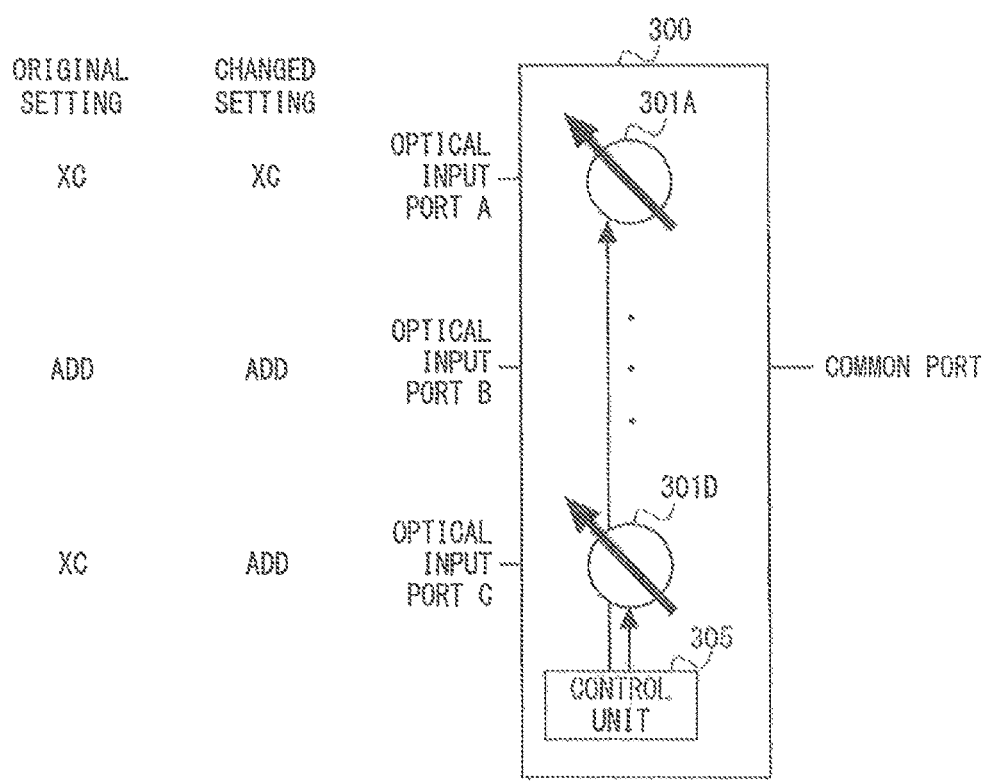
FIG. 8 is a drawing showing an example in which a device to which an input port is connected is changed in a wavelength selective switch according to the third embodiment of the present invention.

FIG. 8 is a drawing showing an example in which the device to which the input port is connected is changed in the wavelength selective switch according to the third embodiment of the present invention. In FIG. 8, XC indicates that the connection destination is a cross-connect (wavelength cross-connect), and ADD indicates an adding client device, in FIG. 8, the wavelength selective switch 300 is connected to the cross-connects at the optical input ports A and C and to the adding client device at the optical output port B.

When the connected device of the optical output port C is changed from the cross-connect to the adding client device, the control unit 305 instructs the variable optical attenuators 303A to 303D corresponding to the optical output port C to change the attenuation amount.

By changing the attenuation amount in this way, the power of the signal from the optical output port C becomes a level suitable for the adding client device.

As described so far, according to the add/drop multiplexer of the third embodiment, when the device to which the port is connected is changed, by changing the attenuation amount of the optical signal corresponding to the connected device, the device connected to the port can be arbitrarily changed. Thus resources of the limited number of ports can be effectively used. Further, since the device connected to the port can be arbitrarily changed, flexible operations of the devices connected to the add/drop multiplexer are possible.

It is preferable to apply the wavelength selective switch of the third embodiment to a wavelength path communication node device. Hereinafter, an example in which the wavelength selective switch is applied to the wavelength path communication node device will be described.

FIG. 9 is a block diagram showing a configuration example of the wavelength path communication node device according to the third embodiment of the present invention. In FIG. 9, a wavelength path communication node device 400 includes a Wavelength Cross-Connect WXC 401, a Wavelength Cross-Connect WXC 402, optical receivers 410 and 411, optical transmitters 412 and 413, add/drop 420 and 421, and an aggregator 430. Further, the wavelength path communication node device 400 exchanges optical signals with the client devices 440 to 443. The function and operation of each component are described below.

The wavelength cross-connect WXC 401 includes wavelength selective switches WSS 401A and 401B. Likewise, the wavelength cross-connect WXC 402 includes wavelength selective switches WSS 402A and 402B. These wavelength selective switches are each composed of an optical module and a control module. The wavelength selective switches each have a port switch function that connects input WDM signals to different output ports for the respective wavelengths and an attenuation function that adjusts transmitted optical power for the respective wavelengths.

The optical receivers 410 and 411 each include an optical attenuator and an optical amplifier. The optical receivers 410 and 411 adjust the power of the optical signals transmitted from the routes, and output the adjusted optical signals to the wavelength selective switches WSS 401A and 402A, respectively.

The optical transmitters 412 and 413 each include an optical amplifier. The optical transmitters 412 and 413 amplify the optical signals transmitted from the wavelength selective switches WSS 401B and 402B, respectively, and output the amplified optical signals to the routes.

The add/drop 420 includes an ODMUX (Optical Demultiplexer) 420A, a transponder 420B, and an OMUX 420C. Likewise, the add/drop 421 includes an ODMUX 421A, a transponder 421B, and an OMUX 421C.

In the ODMUX 420A, a signal wavelength assigned to the client device 440 is extracted from the optical signal output from the wavelength selective switch WSS 401A. Then, the extracted optical signal at the wavelength is output to the client device 440 via the transponder 420B.

Further, the optical signal transmitted from the client device 440 is converted into the wavelength assigned by the transponder 420B, multiplexed by the OMUX 420C, and output to the wavelength selective switch WSS 401B.

The aggregator 430 includes an optical switch 430A and transponders 430B and 430C.

The optical switch 430A selects optical signals to be transmitted to the client devices 442 and 443 from among the optical signals received from the wavelength cross-connects WXC 401 and 402 and outputs the selected optical signals to the client devices 442 and 443 via the transponders 430B and 430C, respectively.

Further, the transponders 430B and 430C convert the optical signals transmitted from the client devices 442 and 443, respectively, into optical signals suitable for wavelength multiplexing. Then, the optical switch 430A selects one of the wavelength cross-connects WXC 401 and 402 and outputs the converted optical signal to the selected wavelength cross-connect.

For example, the transponder 430B may be used for dropping and adding signals transmitted from transmission paths (routes P10a and P10b) for the client device 442, and the transponder 430C may be used for dropping and adding signals transmitted from transmission paths (routes P20a and P20b) for the client device 443. Alternatively, by switching the optical switch 430A, the transponder 430C may be used for dropping and adding signals transmitted from the transmission paths (routes P10a and P10b) for the client device 442, and the transponder 430B may be used for dropping and adding signals transmitted from the transmission paths (P20a and P20b) for the client device 443.

Next, a connection and an operation of the wavelength selective switch for exchanging optical signals with the above-described components will be described.

The wavelength selective switch WSS 401A is connected to the optical receiver 410 via a common port, and is connected to the ODMUX 420A, the wavelength selective switch WSS 402B, and the optical switch 430A at selective ports. Likewise, the wavelength selective switch WSS 402A is connected to the optical receiver 411 via a common port, and is connected to the ODMUX 421A, the wavelength selective switch WSS 401B, and the optical switch 430A at selective ports.

The wavelength selective switch WSS 401B is connected to the optical transmitter 412 via a common port, and is connected to the OMUX 420C, the wavelength selective switch WSS 402A, and the optical switch 430A at selective ports. Likewise, the wavelength selective switch WSS 402B is connected to the optical transmitter 413 via a common port, and is connected to the OMUX 421C, the wavelength selective switch WSS 401A, and the optical switch 430A at selective ports.

That is, in the wavelength path communication node device 400 of this embodiment, the wavelength selective switches WSS 401A and 402A are included as a configuration for selectively dropping optical signals transmitted from the optical receivers 410 and 411 in addition to the wavelength cross-connect WXC of the ROADM that is not equipped with the CDC function and an aggregator composed of a plurality of optical switches, to thereby achieve the CDC function.

Further, the selective ports of the wavelength selective switches are connected to the wavelength selective switches, the aggregators, the clients for which optical signals are added or dropped, and thus the connected device can be changed.

Next, signal processing will be described. Signal power of the wavelength multiplex signal transmitted from the route P10b is adjusted by the optical receiver 410, and the wavelength multiplex signal is output to the common port of the wavelength selective switch WSS 401A. Then, the wavelength selective switch WSS 401A selects the selective port for outputting the wavelength multiplexed signal for the corresponding wavelength, and outputs the selected optical signal to the ODMUX 420A, the wavelength selective switch WSS 402B, or the optical switch 430A connected to the selective ports.

The ODMUX 420A extracts the signal wavelength assigned to the client device 440 from the optical signal output to the ODMUX 420A, and then the extracted optical signal at the wavelength is output to the client device 440 via the transponder 420B.

The optical signal output to the wavelength selective switch WSS 402B is added to another optical signal by the wavelength selective switch WSS 402B, power adjustment and the like are performed on the optical by the optical transmitter 413, and then the optical signal is sent to the route P20a.

The optical switch 430A selects the optical signals to be transmitted to the client devices 442 and 443 from among the optical signals output to the optical switch 430A, and outputs the selected optical signals to the client devices 442 and 443 via the transponders 430B and 430C, respectively.

In this way, the wavelength selective switch selects the optical signals for the respective wavelengths from among the wavelength multiplexed signals transmitted from the routes, and then outputs the selected optical signals to the route or the client device.

Further, the optical signal from the client device is also output to the optical switch 430A via the transponder 430B or 430C, and the optical switch 430A outputs the converted optical signal to the selected wavelength cross-connect. Then, the optical signal is added to another optical signal by the wavelength selective switch, and output to the route via the optical transmitter.

As described above, in the wavelength path communication node device of this embodiment, the wavelength selective switch outputs the optical signals at different wavelengths transmitted from the route to one of the wavelength selective switch, the aggregator, and the ODMUX/OMUX which are on the side opposite to the former wavelength selective switch where the optical signals are to be added, and then optimal ATT adjustment is performed based on the output/input port information. By doing so, a RODAM composed of the wavelength cross-connects and the aggregators with optimal power configuration can be achieved. It is thus possible to achieve the wavelength path communication node device with no collision of wavelengths and routes that is capable of connecting an arbitrary connection destination to an arbitrary port, capable of outputting arbitrary wavelengths, and capable of outputting them to arbitrary routes.

Note that the wavelength selective switch WSS 401A of the wavelength cross-connect WXC 401 in FIG. 9 and the wavelength selective switch WSS 402A of the wavelength cross-connect WXC 402 may be replaced by splitters.

In addition, although FIG. 9 shows an example of the wavelength selective switches with two routes, the number of ports of the WSS may be increased and changed to an arbitrary number of routes. Further, the number of times of wavelength multiplexing of the wavelength multiplexed optical signal to be outputted to each port may be changed to an arbitrary number.

Fourth Embodiment

Figure 10:
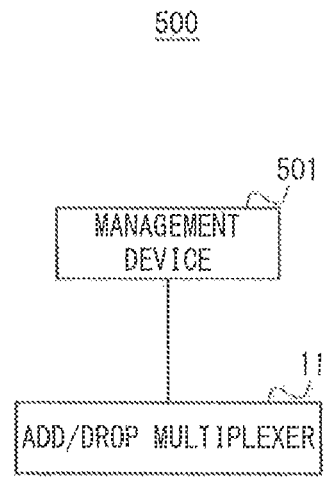
FIG. 10 is a drawing showing a configuration of a network system according to a fourth embodiment of the present invention.

In a fourth embodiment, a device for controlling the add/drop multiplexers of the first to third embodiments will be described. FIG. 10 is a drawing showing a configuration of a network management system according to the fourth embodiment. In FIG. 10, a network management system 500 includes a management device 501 and the add/drop multiplexer 11. The management device 501 is, for example, an NMS (Network Management System)/EMS (Element Management System) or the like for managing communication networks and network devices.

The management device 501 accepts registration of connection information from a user and registers the connection information. Then, the management device 501 transmits the connection information to the add/drop multiplexer 11. When the management device 501 receives the connection information indicating that the device connected to the add/drop multiplexer 11 is changed, it notifies the add/drop multiplexer 11 that the connected device is changed.

The add/drop multiplexer 11 is the add/drop device according to any one of the first to third embodiments. When add/drop multiplexer 11 receives the connection information on the change of the connected device, the add/drop multiplexer 11 changes the attenuation amount of the optical signal communicated by the add/drop multiplexer 11.

Figure 11:
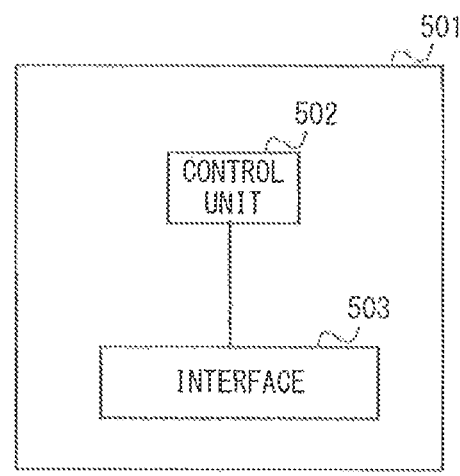
FIG. 11 is a block diagram showing a configuration of a management device according to the fourth embodiment of the present invention.

Next, a configuration of the management device 501 will be described. FIG. 11 is a block diagram showing the configuration of the management device according to the fourth embodiment.

In FIG. 11, the management device 501 includes a control unit 502 and an interface 503.

The control unit 502 accepts registration and a change of the connection information from the user and registers the connection information. Then, when the control unit 502 receives the connection information indicating that the device connected to the add/drop multiplexer 11 is changed, the control unit 502 outputs, to the interface 503, the connection information indicating that the device connected to the add/drop multiplexer 11 is changed.

The interface 503 is an interface for outputting the connection information output from the control unit 502 to the add/drop multiplexer 11. The interface 503 is preferably configured to communicate with the add/drop multiplexer 11 by electric or optical communication.

As described above, according to the management device of the fourth embodiment, when the device connected to the add/drop multiplexer is changed, it is possible to notify the add/drop multiplexer of the change of the connection. Thus, the add/drop multiplexer can be arbitrarily changed by remote control.

In the fourth embodiment, the control unit 502 of the management device 501 may indicate the attenuation amount for each input port and for each wavelength of the optical signal communicated by the add/drop multiplexer 11.

Furthermore, in the respective embodiments, the attenuation amount includes zero. That is, when it is configured that no attenuation is to be performed, the attenuation amount is zero. Further, in the respective embodiments, an amplifier may be provided in place of the attenuator, and the power of the optical signals may be amplified by using the attenuation amount as an amplification amount. In this case, the control unit 102 of the add/drop multiplexer 11 and the control unit 502 of the management device 501 control/indicate the amplification amount for each input port and for each wavelength of the optical signal communicated by the add/drop multiplexer 11.

Further, the optical signal may be transferred by multicast.

In each of the aforementioned embodiments, the control unit or the operation and configuration relating to the control may be executed by a hardware such as an Application Specific integrated Circuit (ASIC) or software. Further, some of the processing may be executed by software and the other processing may be executed by hardware. When the processing is executed by software, a computer system such as a microprocessor including one or a plurality of central processing units (CPUs) may execute a program regarding processing of the functional blocks. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc Read Only Memory), CD-R, CD-R/W, DVD-R (DVD Recordable), DVD-R DL (DVD-R Dual Layer), DVD-RW (DVD Rewritable), DVD-RAM, DVD+R, DVR+R DL, DVD+RW, BD-R (Blu-ray (registered trademark) Disc Recordable), BD-RE (Blu-ray (registered trademark) Disc Rewritable), BD-ROM, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been described with reference to the embodiments, the present invention is not limited by the above. Note that the present invention is not limited to the above-described embodiments, and modifications can be made as appropriate without departing from the scope thereof.

The present application is based upon and claims the benefit of priority from Japanese Patent Application No. 2015-13258, filed on Jan. 27, 2015, the entire contents of which are hereby incorporated by reference.

INDUSTRIAL APPLICABILITY

The present invention can be preferably applied to a wavelength path communication node device and a transmission method used in an optical communication network using wavelength division multiplexing and demultiplexing technique.

REFERENCE SIGNS LIST

10 NETWORK SYSTEM
15-19 NETWORK
11-14 ADD/DROP MULTIPLEXER
20-21 TERMINAL STATION
22, 440-443 CLIENT DEVICE
101 COMMUNICATION UNIT
102 CONTROL UNIT
111 DROP UNIT
112 ADD UNIT
200, 300, 401A-402B WAVELENGTH SELECTIVE SWITCH
201, 301A-301C WAVELENGTH DEMULTIPLEXER
202A-202D, 303A-303D VARIABLE OPTICAL ATTENUATOR
203A-203D, 302A-302D, 430A OPTICAL SWITCH
204A-204C, 304 MULTIPLEXER
205, 305, 502 CONTROL UNIT
400 WAVELENGTH PATH COMMUNICATION NODE DEVICE
401, 402 WAVELENGTH CROSS-CONNECT
410, 411 OPTICAL RECEIVER
4 12, 413 OPTICAL TRANSMITTER
420, 421 DROP
420B, 421B, 430B, 430C TRANSPONDER
430 AGGREGATOR
500 NETWORK MANAGEMENT SYSTEM
501 MANAGEMENT DEVICE
503 INTERFACE

The invention claimed is:

1. A network system comprising:
a control device; and
an add/drop multiplexer, wherein
the control device comprising:
an interface configured to be capable of transferring the add/drop multiplexer; and
a first controller capable of controlling the add/drop multiplexer via the interface, wherein
the first controller transmits, to the add/drop multiplexer, the connection information indicating that the device connected to the add/drop multiplexer is changed, when the device connected to the add/drop multiplexer is changed,
the add/drop multiplexer comprising:
a transmitter configured to be capable of selectively transferring a received wavelength multiplex optical signal to at least one client device and at least one network for each wavelength constituting the wavelength multiplex optical signal; and
a second controller configured to indicate a transfer destination of an optical signal at a predetermined wavelength according to an attribute of the optical signal at the predetermined wavelength to the transmitter, the predetermined wavelength being included in the wavelength multiplex optical signal, wherein
the second controller indicates the attenuation amount specified for each device connected to the transmitter to the transmitter, when the second controller receives the connection information indicating that the device connected to the add/drop multiplexer is changed
the transmitter the optical signal at the predetermined wavelength according to the attenuation amount and transfers the attenuated optical signal to the transfer destination.

2. The network system according to claim 1, wherein the add/drop multiplexer attenuates the wavelength multiplex optical signal transmitted from the client device or the network and adds the attenuated wavelength multiplex optical signal to an optical signal to be transferred to a transfer destination network or the add/drop multiplexer attenuates the wavelength multiplex optical signal transmitted from the network and drops an optical signal from the wavelength multiplex optical signal to be transferred to a transfer destination network device or a network.

3. The network system according to claim 1, wherein the add/drop multiplexer attenuates the wavelength multiplex optical signal transmitted from the client device or the network and adds the attenuated wavelength multiplex optical signal to an optical signal to be transferred to a transfer destination network, and the add/drop multiplexer attenuates the wavelength multiplex optical signal transmitted from the network and drops an optical signal from the wavelength multiplex optical signal to be transferred to a transfer destination network device or a network.

4. The network system according to claim 1 wherein the add/drop multiplexer comprises a plurality of optical input ports, attenuators attenuating optical signals input from the plurality of optical input ports, wavelength multiplexer wavelength-multiplexing the optical signals attenuated by the attenuators, and output unit transferring the optical signal wavelength-multiplexed by the wavelength-multiplexer to the transfer destination, and controller indicating the attenuation amount for each attenuators.

5. The network system according to claim 4, wherein the add/drop multiplexer further comprises wavelength demultiplexer demultiplexing the wavelength multiplexed optical signal input from the optical input ports into optical signals at different wavelengths, an optical switch that selects one of demultiplexed optical signals at the respective wavelengths, and the attenuators individually attenuates the optical signal selected by the optical switch.

6. The network system according to claim 5, wherein the controller can specify the attenuation amount for each wavelength demultiplexed by the wavelength demultiplexer.

7. The network system according to claim 1 wherein the add/drop multiplexer further comprises wavelength demultiplexer demultiplexing the wavelength multiplexed optical signal transmitted from the network into optical signals at different wavelengths, variable optical attenuators attenuating each of the optical signals demultiplexed by the wavelength demultiplexer with the specified attenuation amount, an optical switch configured to select an optical output port for outputting the optical signal attenuated by the variable optical attenuators, and a multiplexer configured to multiplex the optical signals transmitted from the optical switch for each optical output port.

8. The network system according to claim 7, wherein the second controller can specify the attenuation amount for each wavelength demultiplexed by the wavelength demultiplexer.

* * * * *